Feb. 6, 1945.  E. O. BURTON ET AL  2,368,743
CONTROLLING AND INDICATING APPARATUS
Filed March 16, 1942   2 Sheets-Sheet 1
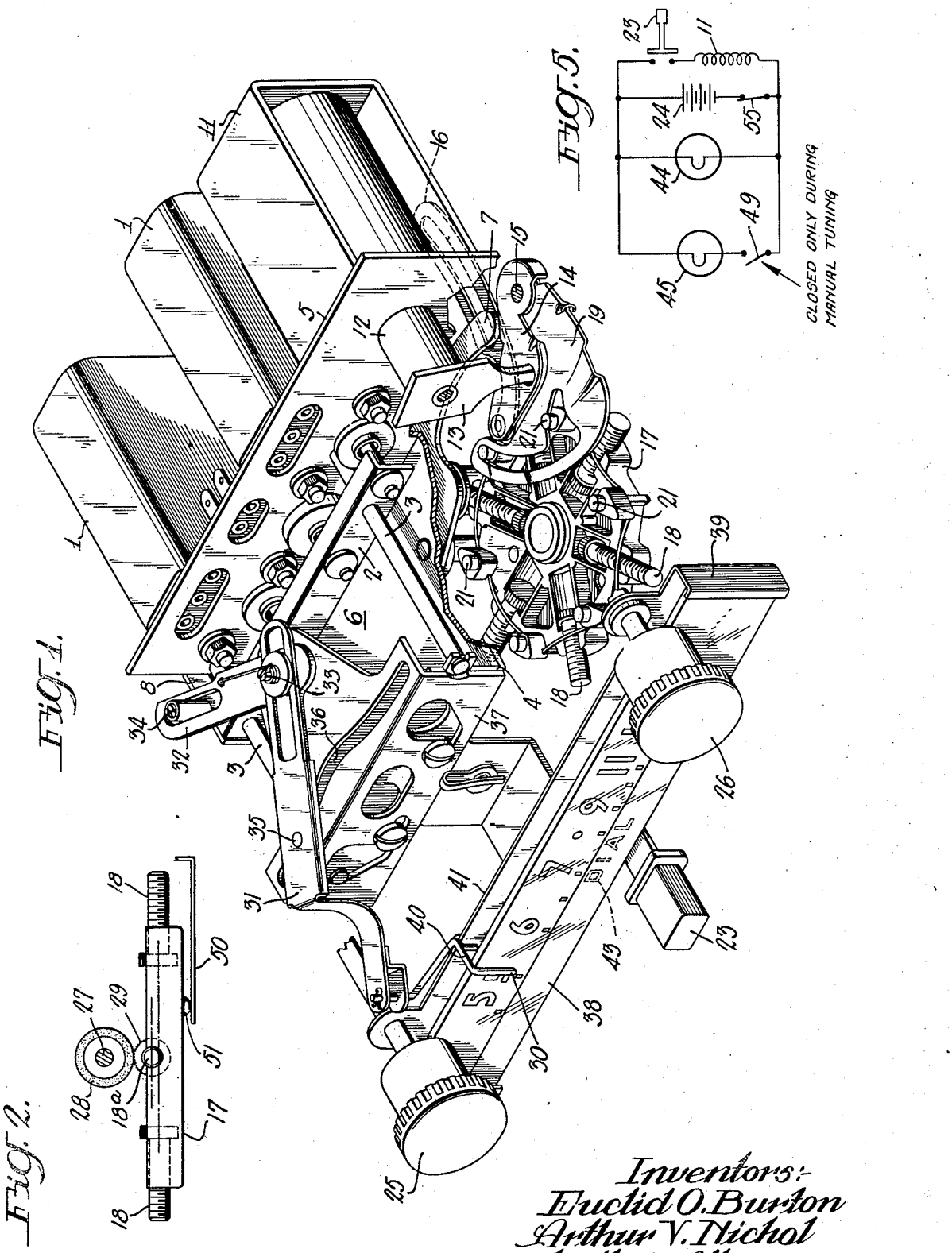
Inventors:-
Euclid O. Burton
Arthur V. Nichol
by their Attorneys
Howson & Howson Feb. 6, 1945. E. O. BURTON ET AL 2,368,743
CONTROLLING AND INDICATING APPARATUS
Filed March 16, 1942 2 Sheets-Sheet 2

Inventors:-
Euclid O. Burton
Arthur V. Nichol
by their Attorneys
Howson & Howson Patented Feb. 6, 1945

2,368,743

UNITED STATES PATENT OFFICE 2,368,743

CONTROLLING AND INDICATING APPARATUS

Euclid O. Burton and Arthur V. Nichol, Detroit, Mich., assignors to Philco Radio and Television Corporation, Philadelphia, Pa., a corporation of Delaware Application March 16, 1942, Serial No. 434,952

10 Claims. (Cl. 177—311)

This invention relates to controlling and indicating apparatus and is particularly directed to novel means for giving a distinctive indication during certain operation of the apparatus. More specifically, the invention relates to controlling and indicating apparatus wherein provision is made for either so-called automatic or manual control of the controlled means, and novel means are provided for indicating the control action and for giving a distinctive indication when the apparatus is conditioned for one of said modes of control. For example, the invention is particularly applicable to radio tuning and indicating apparatus having provision for both automatic and manual tuning.

In one form of such apparatus designed especially for use in automobile radio receivers, a multi-position element, actuated by a single control member, effects the automatic tuning and also conditions the apparatus for manual tuning. According to the present invention, the operator may be apprised of the conditioning of the apparatus for manual tuning by novel indicating means operatively associated with the said multi-position element. Further, the said indicating means may be incorporated in a single dial arrangement serving as a tuning indicator during both modes of tuning.

The primary object of the invention, therefore, is to provide controlling and indicating apparatus adapted for two different modes of operation, and embodying novel means for indicating the conditioning of the apparatus for one of its modes of operation.

A more specific object of the invention is to provide a novel tuning and indicating mechanism for radio receivers, having provision for automatic or manual tuning, and embodying novel means for indicating when mechanism is conditioned for manual tuning.

Another object of the invention is to provide a single indicating dial for the apparatus and novel means for illuminating the dial, such that a changeover from one mode of operation to the other automatically effects a change in the color or the characteristic appearance of the dial, and in addition, causes an appropriate word or mark to become visible.

A further object of the invention is to provide a novel dial assembly which is of very small overall height, is attractive in appearance, and lends itself well to distinctive and decorative color effects.

Still another object of the invention is to provide a radio tuning and indicating apparatus in which a multi-position element is actuated by a single control member to effect automatic tuning and to condition the apparatus for manual tuning, and means are provided to give an indication when said element is in the manual tuning position.

A still further object of the invention is to provide switching means associated with said multi-position element and adapted to operate an indicating means when said element is in the manual tuning position.

Other objects and features of the invention will appear hereinafter.

In the accompanying drawings:

Fig. 1 is a perspective view of a radio tuning mechanism of the above-mentioned type and an associated indicating dial;

Fig. 2 is an elevational view of a portion of the mechanism shown in Fig. 1;

Fig. 5 is a diagram of the circuit employed.

Figure 3:
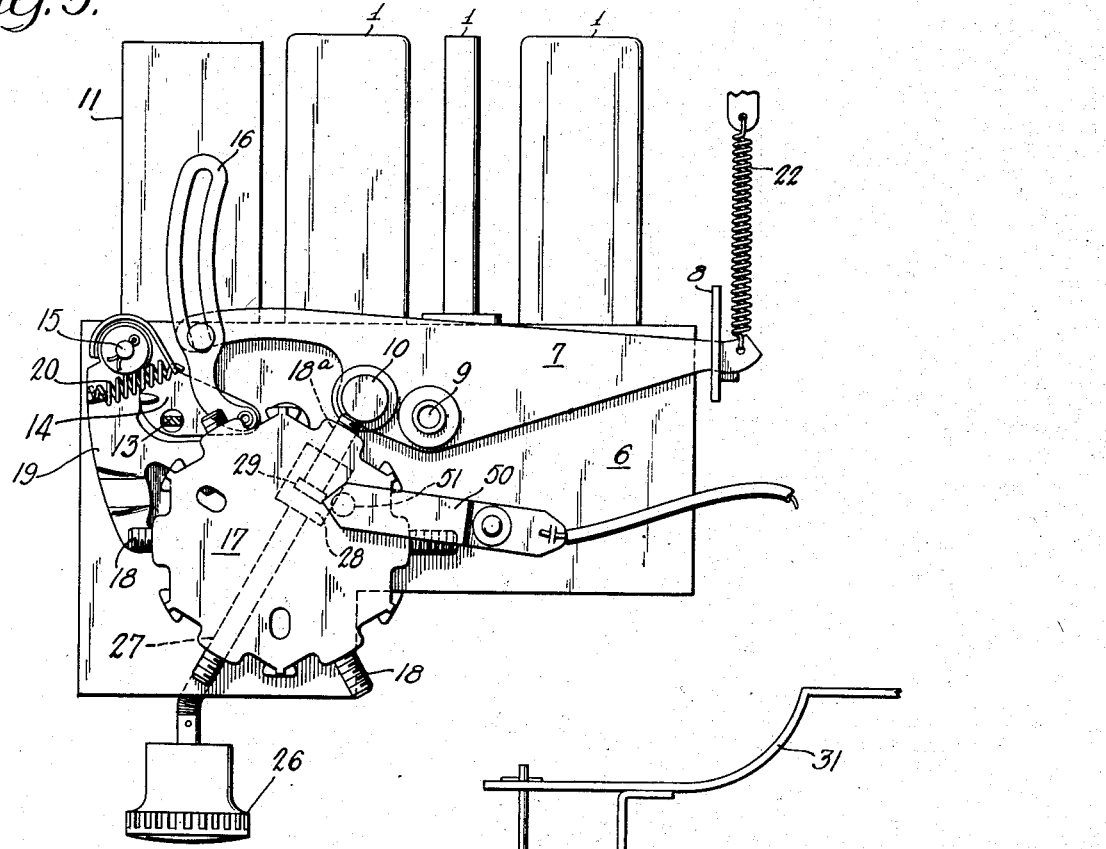
Fig. 3 is a bottom view of the operating mechanism.

The invention is illustrated with the novel tuning apparatus fully described and claimed in the copending application of Lyman et al., Serial No. 427,366, filed January 19, 1942, now Patent No. 2,313,653, granted March 9, 1943. Although its use is not limited thereto, the invention is particularly applicable to a mechanism of this type. However, as the particular tuning mechanism, per se, forms no part of the present invention, and is fully described in said copending application its description here will be limited to those essentials which are necessary to a complete understanding of the application of the present invention.

Referring to the drawings, the embodiment illustrated comprises an inductance tuner having a plurality of coils 1 (two being shown in shielding cans) with their associated movable core members fixed to a single movable carriage 2. The carriage is mounted for sliding movement on a pair of spaced rods 3—3, carried by upstanding flanges 4 and 5, formed at the forward and rear edges, respectively, of a main base plate 6. The carriage is moved by a cooperating lever 7 which underlies the base plate 6 (see Fig. 3), and has one end in driving engagement with a plate 8 fixed to one end of said carriage. Lever 7 is pivoted intermediate its ends as at 9, carries a stop 10, and is adapted to be moved by some suitable means, a solenoid 11 being used in this instance. As is seen from Figs. 1 and 3, the solenoid core 12 carries a depending finger 13, which is adapted to rotate a small lever 14 about its pivot 15. A slotted sector member 16 provides a connection between the levers 7 and 14, and it will be evident that pulling of core 12 into the solenoid will rotate lever 7 about its pivot 9 and move the carriage 2 forwardly of its position as seen in Fig. 1.

The position that the carriage finally assumes will determine the frequency to which the receiver is tuned, as is well understood; and for determining the final position of the carriage the tuner illustrated provides a rotatable turret member 17 having a series of adjustable stops 18 arranged around its periphery, and each extending a different distance therefrom. The turret or wheel 17 is mounted for step-by-step rotational movements in the plane of stop 10 carried by lever 7, and with each step of the wheel, a different one of the stops 18 is positioned to cooperate with lever 7 to position the same. The step-by-step movement of wheel 17 is effected by a slotted cam member 19 mounted on pivot 15 in cooperative association with lever 14 and connected thereto by a spring 20. Cam member 19 engages studs 21 on wheel 17 to actuate the same. The cam member is so designed that it engages and releases the studs 21 successively, in response to repeated actuation of lever 14 by solenoid 11, thus effecting step-by-step movement of wheel 17. The energization of the solenoid serves both to move the carriage to one extreme of its range of movement, and to bring one of the radial stops 18 into position to cooperate with the pivoted lever 7 to position the same. A spring 22 (see Fig. 3) urges lever 7 back from its extreme position and into contact with the particular stop which is in operative position, thus automatically effecting a different tuning position of the carriage for each energization of the solenoid. A manually operable member 23 is adapted to actuate the solenoid control switch (see Fig. 5), thereby energizing the solenoid from a suitable source represented as a battery at 24.

Thus the device is adapted for automatic tuning of the associated receiver to predetermined stations. By adjustment of the stops 18 it is possible to select or set up in advance the stations which it is desired to tune in automatically.

The tuner illustrated is also capable of continuous manual adjustment through the entire frequency range over which it is operative, as will now be described. As best seen in Fig. 2, there is provided a specially arranged screw-stop 18a which, as indicated by the center lines on the figure, is elevated slightly above the plane of the other stops. It is this stop which is utilized to effect manual adjustment of the tuning. A pair of control knobs 25 and 26 overlie and extend beyond the novel dial scale of the invention, which scale will be fully described later. Knob 25 is adapted for connection to the usual "on-off" switch and volume control device (not illustrated), while knob 26 drives a shaft 27, used to effect manual control of the tuning device. This shaft and its associated control elements have been omitted in Fig. 1, for the sake of clarity of illustration of other parts, but are illustrated in Figs. 2 and 3.

Shaft 27 is arranged to overlie wheel 17, and carries a friction roller 28, adapted to engage the knurled head 29 on screw 18a when wheel 17 has been "stepped" to the position shown in Fig. 3, i. e., with screw 18a beneath roller 28 and in operative relation to lever 7. The mounting for roller 28 is such that the screws 18 will pass freely beneath the roller, while screw 18a will be engaged thereby because of its higher elevation. By virtue of the threaded engagement of screw 18a with wheel 17, rotation of knob 26 and consequent rotation of roller 28 will effect variation of the extension of the screw from wheel 17. In this manner, the position of lever 7 may be adjusted, and the tuning position of carriage 2 manually controlled.

A pointer 30 provides positive indication of the tuning under both modes of operation of which the illustrated tuning apparatus is capable. The pointer is pivotally connected to a slotted arm 31 which is driven by a bell crank lever 32 pivoted at 33 and actuated by a pin 34 on carriage 2. A pin 35 on arm 31 rides in a cam slot 36 provided in the supporting bracket 37 for the actuating linkage. This structure effects straight line movement of the pointer along the dial.

Figure 4:
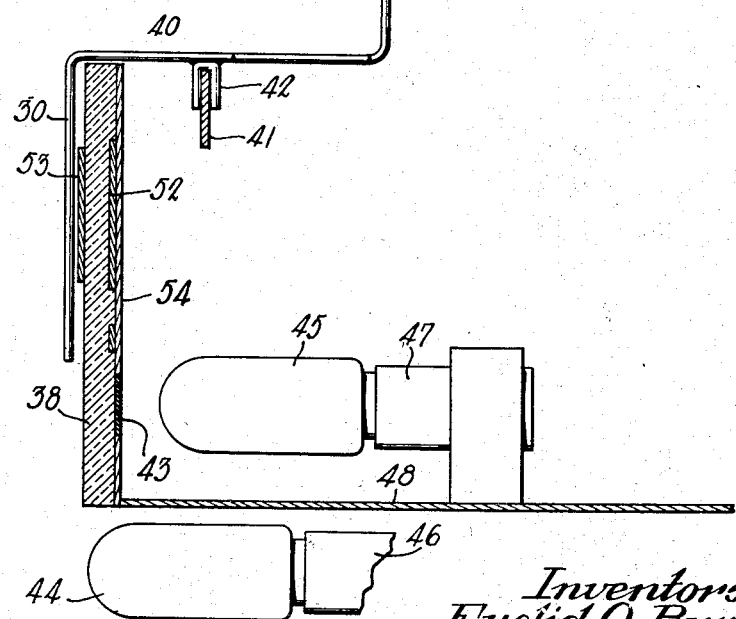
Fig. 4 is an enlarged sectional view of the indicating dial arrangement.

Referring to Figs. 1 and 4, it will be seen that the dial assembly comprises a plate 38, of glass or some other suitable material, supported by end brackets 39 and bearing suitable indicia thereon, with which pointer 30 is adapted to cooperate. The pointer 30 has a rearwardly extending portion 40 which is carried by a transverse guide plate 41, by means of a slidable fork 42. In addition to the usual frequency designations, dial 38 carries suitable lettering 43 and, as will be brought out fully as the description proceeds, the numerals provide an indication of the tuning adjustment under both modes of operation of which the device is capable (i. e., either manual or push-button); while the lettering 43 only appears when the device is conditioned for manual dial control.

For the purpose of this invention, there are also provided a pair of lamps 44—45 mounted in sockets 46—47, which may be supported in any suitable manner and energized from a convenient current supply, such as the battery 24 (Fig. 5). Lamp 44 projects somewhat past the lower edge of scale 38 and this lamp constitutes a source of edge lighting for the dial. In the embodiment illustrated, lamp 44 is adapted to remain lighted under all conditions of operation (see Fig. 5) and serves to illuminate the scale numerals in a manner which will appear below. The second lamp 45 provides a source of back lighting for the dial, and a light mask 48, which extends across the entire length of dial 38, is interposed between the lamps to insure that there will be no interference between the separate light sources.

Lamp 45 is energized only when the device is conditioned for manual tuning in the manner above explained. This lamp is controlled by a switch 49, which, as indicated in Fig. 5 is closed only during manual tuning. As shown in Figs. 2 and 3, switch 49 comprises a spring finger 50 carried by plate 6 but insulated therefrom, and arranged to engage a button 51 on wheel 17. Button 51 is so positioned that it is engaged by the stationary finger 50 only when wheel 17 is rotated to the manual control position. At such time finger 50 is grounded through wheel 17 and the metal framework of the device, thereby closing the circuit of lamp 45.

Turning to the dial scale per se, reference to Fig. 4 shows the manner in which the indicia is preferably placed thereon, in order to best cooperate with the dual lighting means. It should be borne in mind that this may be done in a variety of different ways, involving combinations of painting, printing, lithographing and like processes. However, the manner in which this is done is not of particular importance, so long as the indicia is applied in such a way as to produce the desired result.

In the illustrated structure, the numerals, which are preferably continuously illuminated and are of the type giving a three-dimensional effect, consist of two spaced layers of paint 52 and 53. The desired numerals have first been etched or sand blasted into the rear face of dial 38, after which the layer of paint identified as 52 has been applied in the resulting depression. The second layer of paint, 53, may be of some contrasting color if desired, and is applied to the front face of the dial in registry with the letters defined by layer 52. A layer of opaque backing paint 54 has also been applied to the entire back of the glass. This backing paint may also be of one or more suitable contrasting colors, to produce the desired effects when the dial is lighted. As is well known, this type of lettering in conjunction with the edge light 44, will cause the letters to stand out in bold relief.

Below these numerals, at 43, letters of translucent paint have been applied to the back of dial 38 and are recessed (or stenciled) into the backing paint 54. The word defined by paint 43 (in this case "Dial" is used) does not extend into the body of the glass as do the numerals 52, and will, therefore, not appear in response to the edge light 44. However, they will stand out brightly, by reason of the translucent paint used, when the back light 45 is switched on.

It will be evident that the dial and its lighting means may take a number of different forms. For example, the dial may be curved, provided it is made of some suitable synthetic resin or the like in order that the edge lighting may travel around said dial. In such case the configuration of cam slot 36 would be changed, in order that the pointer 30 may follow the curve of the dial. Similarly, a mask may be used in place of the opaque backing paint 54, in which case this mask would be suitably apertured to define the letters 43 under the back lighted condition.

Fig. 5 shows the circuit of the device and illustrates the operation of the dial lamps as described above. It will be seen that the edge light 44 is always connected across the energizing source, while back light 45 is energized only when the wheel 17 has been "stepped" to the position shown in Fig. 3, i. e., when the receiver is conditioned for manual operation and the cooperating contacts 50 and 51 are closed. As will now be evident, when this position of wheel 17 has been reached, the circuit is automatically closed to back light 45, and the word "dial" will stand out sharply thus giving the operator a positive visual indication that the set is conditioned for manual tuning. The circuit also includes an on-off switch 55 which may be ganged with the on-off switch of the receiver.

From the above, it may be seen that this invention provides a novel indicating mechanism which is useful to an operator under two conditions of operation of the device to be controlled, and in which a changeover from one use of the device to the other automatically actuates a novel means providing a positive visual indication of the mode of operation to be followed. Moreover, the invention makes possible the use of dials of very small height, as one set of frequency designations may be used under both conditions of operation. If space limitations require it, the height of the dial may be still further shortened by moving the back light indicia closer to, or even into, the zone of the numerals. In addition, the invention provides a dial assembly which may have several separate, decorative color effects, thereby enhancing the appearance of the apparatus. For example, the lower half of the dial may be painted in a color contrasting with the upper half and, if desired, may be made translucent to show up brightly under one operating condition.

It will be apparent that the invention is capable of various modifications, and it is to be understood, therefore, that the invention contemplates such changes and modifications as may fall within the scope of the appended claims.

We claim:

1. In combination with apparatus capable of two different modes of adjustment, a dial bearing indicia adapted to indicate the position of adjustment of said apparatus when it is controlled by either mode of adjustment, said dial further bearing other indicia adapted to provide a visual indication of the mode of adjustment for which the apparatus is conditioned, means for selecting either mode of adjustment, a source of light providing edge illumination of said dial, a second source of light providing back illumination of said dial, said first-mentioned indicia being adapted to appear in response to edge lighting of said dial and said second-mentioned indicia being adapted to appear in response to back lighting thereof, and means controlled by said selecting means for energizing said back lighting source only when the apparatus is conditioned for one of said modes of adjustment.

2. In radio tuning apparatus having provision for both automatic and manual tuning control, a dial bearing one type of indicia adapted to indicate the tuning adjustment of said apparatus when it is conditioned for either mode of control, said dial further bearing another type of indicia adapted to provide a visual indication of the mode of control for which the apparatus is conditioned, means for selecting either mode of control, a source of light providing edge illumination of said dial, a second source of light providing back illumination of said dial, one of said two types of indicia being adapted to appear in response to edge lighting of said dial and the other of said types being adapted to appear in response to back lighting thereof, and means controlled by said selecting means for energizing one of said light sources only when the apparatus is conditioned for one of said modes of control.

3. In radio tuning apparatus, rotatable means for effecting automatic tuning control, means for effecting manual tuning control when said rotatable means is in one position, a single dial bearing one type of indicia adapted to indicate the tuning adjustment of said apparatus, said dial further bearing another type of indicia adapted to provide a visual indication when the apparatus is conditioned for manual tuning, a source of light providing edge illumination of said dial, a second source of light providing back illumination of said dial, the first-mentioned indicia being adapted to appear in response to edge lighting of said dial and the other indicia being adapted to appear in response to back lighting thereof, and means for energizing said second light source only when said rotatable means is in said one position.

4. In radio tuning apparatus capable of both manual and automatic tuning adjustment, a progressively movable element adapted to effect automatic tuning adjustment with each progressive step, means for effecting manual tuning adjustment when said movable element has reached a predetermined position, a dial bearing indicia adapted to indicate the tuning adjustment of said apparatus, said dial further bearing other indicia adapted to provide a visual indication when the apparatus is conditioned for manual tuning, a source of light providing edge illumination of said dial, a second source of light providing back illumination of said dial, said first-mentioned indicia being adapted to appear in response to edge lighting of said dial, said second-mentioned indicia being adapted to appear in response to back lighting of said dial, and means for energizing said second light source only when said movable element has reached said predetermined position.

5. An apparatus according to claim 4, wherein said last means comprises an electrical circuit including said second light source and a switch adapted to close said circuit when the movable element has reached said predetermined position.

6. In a radio tuning and indicating mechanism, adjustable tuning means, means including a step-by-step element for actuating said tuning means to different predetermined positions, a single manual control member for operating said actuating means and for moving said element to successive positions, means operable when said element is in one of its positions for manually adjusting said tuning means to any position within its operating range, a tuning indicator dial, means for indicating the position of said tuning means on said dial, and means for indicating on said dial the positioning of said element for manual tuning.

7. In a radio tuning and indicating mechanism, adjustable tuning means, means including a step-by-step element for actuating said tuning means to different predetermined positions, a plurality of stops on said element for determining the position of said tuning means for each position of said element, means operable when said element is in one of its positions for manually adjusting the operative stop on said element, to thereby adjust said tuning means to any position within its operating range, a tuning indicator dial, means for indicating the position of said tuning means on said dial, and means for indicating on said dial the positioning of said element for manual tuning.

8. In a positioning and indicating mechanism, adjustable means to be positioned, a first manually-operable member, means operable by said member to actuate said adjustable means, a second manually-operable member, means controlled by said first member for establishing a driving linkage between said second member and said adjustable means, whereby said adjustable means may be actuated by said second member, and means responsive to the establishment of said driving linkage for indicating that the mechanism is conditioned for operation by said second member.

9. In a positioning and indicating mechanism, adjustable means to be positioned, a manually-depressible member, means operable in response to successive actuations of said member for actuating said adjustable means to different predetermined positions, said last-named means including an element movable to successive positions, means for indicating the position of said adjustable means, a manually-rotatable member, means operable by said rotatable member to adjust said adjustable means only when said element is in one of its positions, and means operable by said element when it reaches said one position to apprise the operator that the mechanism is conditioned for operation by said rotatable member.

10. In a positioning and indicating mechanism, adjustable means to be positioned, a manually-depressible member, means operable in response to successive actuations of said member for actuating said adjustable means to different predetermined positions, said last-named means including an element movable to successive positions and having a plurality of stops for determining the positions of said adjustable means, means for indicating the position of said adjustable means, a manually-rotatable member, means operable by said rotatable member when said element is in one of its positions for adjusting the operative stop on said element, to thereby adjust said adjustable means, and means operable by said element when it reaches said one position to apprise the operator that the mechanism is conditioned for operation by said rotatable member.

EUCLID O. BURTON.
ARTHUR V. NICHOL.